United States Patent [19]
Ashby et al.

[11] Patent Number: 5,463,649
[45] Date of Patent: Oct. 31, 1995

[54] MONOLITHICALLY INTEGRATED SOLID STATE LASER AND WAVEGUIDE USING SPIN-ON GLASS

[75] Inventors: Carol I. H. Ashby, Edgewood; John P. Hohimer, Albuquerque; Daniel R. Neal, Tijeras; G. Allen Vawter, Albuquerque, all of N.M.

[73] Assignee: Sandia Corporation, Albuquerque, N.M.

[21] Appl. No.: 102,907

[22] Filed: Aug. 6, 1993

[51] Int. Cl.[6] .......................... H01S 3/06; H01S 3/0941; H01S 3/17
[52] U.S. Cl. .................. 372/40; 372/50; 372/75; 385/14; 359/343; 359/345
[58] Field of Search ................... 372/50, 40, 75, 372/70, 20; 385/14, 131, 132; 359/257, 343, 341, 345

[56] References Cited

U.S. PATENT DOCUMENTS

| | | | |
|---|---|---|---|
| 4,767,169 | 8/1988 | Teng et al. | 385/2 |
| 4,859,876 | 8/1989 | Dirk et al. | 372/20 |
| 4,946,235 | 8/1990 | Scozzafava et al. | 350/96.34 |
| 5,003,550 | 8/1991 | Welch et al. | 372/50 |
| 5,026,147 | 6/1991 | Soane et al. | 359/257 |
| 5,033,810 | 7/1991 | Inoue et al. | 350/96.12 |
| 5,117,469 | 5/1992 | Cheung et al. | 385/131 |
| 5,337,401 | 8/1994 | Onishi et al. | 359/343 |
| 5,365,538 | 11/1994 | Tumminelli | 385/131 |
| 5,379,311 | 1/1995 | McFarlane et al. | 372/50 |

FOREIGN PATENT DOCUMENTS 63-23355  6/1988  Japan.

*Primary Examiner*—Rodney B. Bovernick
*Assistant Examiner*—Robert McNutt
*Attorney, Agent, or Firm*—Gregory A. Cone; John P. Hohimer

[57] ABSTRACT

A monolithically integrated photonic circuit combining a semiconductor source of excitation light with an optically active waveguide formed on the substrate. The optically active waveguide is preferably formed of a spin-on glass to which are added optically active materials which can enable lasing action, optical amplification, optical loss, or frequency conversion in the waveguide, depending upon the added material.

6 Claims, 4 Drawing Sheets

MONOLITHICALLY INTEGRATED SOLID STATE LASER AND WAVEGUIDE USING SPIN-ON GLASS

The government has rights in this invention pursuant to Contract No. DE-AC04-76DP00789 awarded by the U.S. Department of Energy.

BACKGROUND OF THE INVENTION

This invention is related to U.S. patent application Ser. No. (08/102906) filed of even date, which is incorporated herein by reference in its entirety.

This invention relates to solid state laser sources, to solid state optical amplifiers, and to photonic integrated circuits. More particularly this invention relates to photonic integrated circuits and components thereof including GaAs or other III-V lasers and optical waveguides, all formed on the same substrate in an integrated process.

In the past, photonic circuits have been handicapped by the frequency mismatch between the typical III-V compound LED or laser diode excitation light sources and active optical media that are readily formed onto a semiconductor substrate by conventional processing techniques. The result has been to force the fabrication of hybrid devices with different portions of these devices being formed separately and then combined into the final hybrid assembly. There has remained a need for an integrated photonic assembly that can combine the excitation light source with the active waveguide in an integrated apparatus.

SUMMARY OF THE INVENTION

At its simplest, this invention is a monolithically integrated solid state optical circuit having a source of light to excite the circuit, an optical waveguide formed on the substrate by conventional semiconductor processing techniques matched to the frequency of the light source, and means to output the light from the waveguide. The waveguide is a matrix of spin-on glass, a polymer or other substance to which material is added to make the waveguide optically active. This activity can include lasing, optical gain, optical loss, frequency conversion, and other effects, depending upon the optical characteristics of the added material.

DETAILED DESCRIPTION OF THE INVENTION

Figure 1:
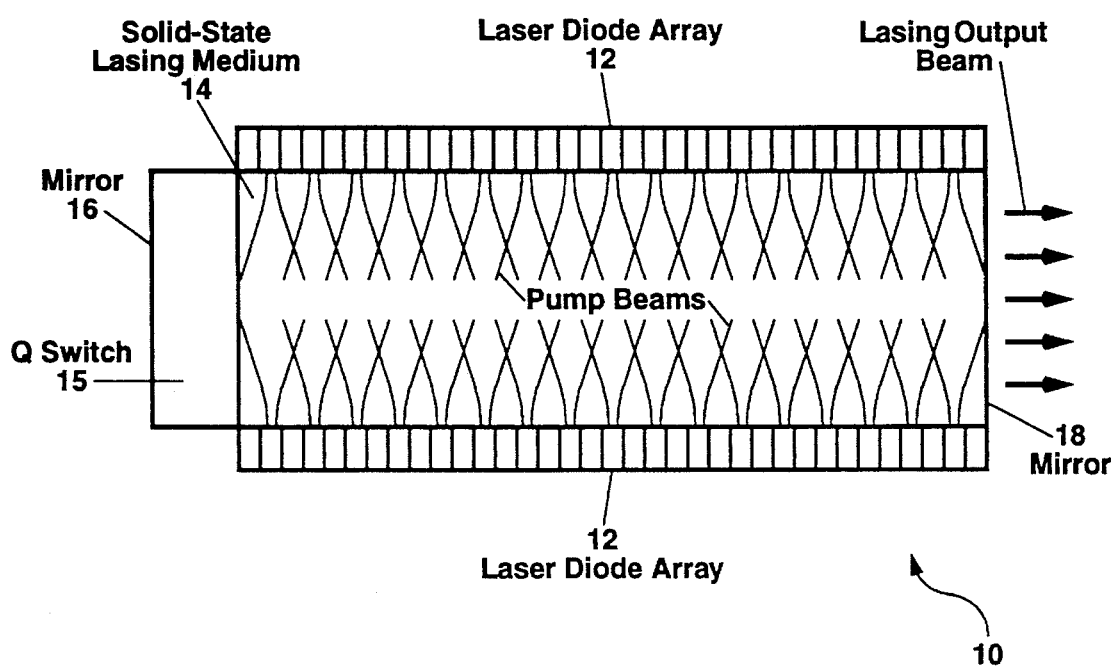
FIG. 1 is a top view of one embodiment of the invention showing the spin-on Nd-doped glass in an optical cavity which is flanked by laser diode arrays to pump the lasing medium in the cavity.

This invention represents a new class of monolithic optical amplification devices and methods for fabrication of these devices. The certain embodiments of these devices employ a monolithically integrated solid-state optical waveguiding medium exhibiting gain with optical pumping by a diode laser or laser array on a single semiconductor substrate. These devices can be fabricated with semiconductor processing techniques that do not involve hybrid assembly. Both the fabrication method and the ability to simultaneously fabricate a large number of devices by this method are novel. Our fabrication method involves the use of a doped spun-on matrix (spin-on-glass or polymer) for the solid-state optical gain medium to monolithically integrate solid state lasers or waveguides with optical gain and their diode pump lasers on the same semiconductor substrate. The concept of doping a matrix with a suitable dopant to produce optical gain is a fundamental concept of our invention. Current technology for diode-pumped solid-state lasers involves hybrid design and manufacturing techniques instead of the monolithic integrated approach possible with our invention. Current monolithic waveguides do not include dopants for producing optical activity in the waveguide.

One embodiment of the invention is a monolithically integrated solid state laser which employs a diode laser array to optically pump a laser gain medium that has been deposited using a spin-on process in a channel fabricated in the same substrate as the semiconductor diode laser array. This optically pumped lasing medium can be a spin-on glass (SOG) medium containing lasing ions, including but not restricted to rare earth ions such as $Nd^{3+}$, or a polymer (P) containing an appropriate laser dye or lasing ions. The use of a spin-on-glass or polymer laser medium to monolithically integrate the solid state laser and its diode pump laser on the same semiconductor wafer represents a new approach to diode-laser pumped solid-state lasers. Current technology for diode-laser-pumped solid-state lasers involves hybrid design and manufacturing techniques instead of our monolithic integrated approach.

The monolithic integration of our solid-state lasers is achieved by using a suitable doped spin-on glass or polymer to deposit a glass or polymer lasing medium directly into a cavity formed monolithically in the wafer containing the pump diode-array lasers. This can be done using conventional spin-on (solvent casting) technology or by some other suitable method. This direct integration of both the pumping diode laser array and the optically pumped glass or polymer laser on the same chip will produce several advantages over current conventional hybrids that use laser diode arrays to pump YAG, glass, or other solid-state lasers that were not fabricated directly on the wafer and require component-level assembly. Some advantages of our invention include small size, low weight, high efficiency, robustness, self-aligned nature, ease of manufacturing using standard device fabrication processes, and lower manufacturing cost. In addition, many SOG or P lasers can be fabricated simultaneously on the same wafer with little or no increase in fabrication time or cost. In contrast, the length of time required to assemble several hybrid lasers on a single wafer would increase proportionately with the number of lasers.

The simplification of fabrication afforded by our invention should result in significantly lower manufacturing costs for our spin-on lasers compared to hybrid lasers due to the nature and similarity of the fabrication processes for the SOG or P and diode-array lasers, and the reduction in the required number of component parts (e.g., elimination of focusing lenses and mounting hardware). The process for fabricating our directly integrated laser sources is simplified by the well-developed state of spin-on glass and polymer technology in semiconductor processing techniques. We envision a greatly increased range of applications for these monolithically integrated laser sources due to the ability to incorporate many lasers and integrated optical components (e.g., waveguides, modulators, detectors) onto a single substrate. In addition, several output coupling schemes for the SOG or P laser are available to provide good beam quality without any external optics.

The preferred embodiment of our invention comprises an optically pumped solid state (SS) laser or doped waveguide monolithically integrated with the pump laser into a single device without the use of hybrid assembly techniques. Our standard method of integration is to apply the doped SOG or P matrix using spin-on technology and to subsequently process using semiconductor fabrication techniques; other application techniques for the SOG and P also may be used. The SS laser or doped waveguide is optically pumped by one or more diode lasers or laser arrays. The diode laser emission wavelength is matched to pump band wavelength of the solid state (SOG or P) laser. The SS laser medium is deposited into a channel formed in part by the output mirrors of the diode laser cavity so that the pump light is direct-coupled into the solid-state laser, which is diode pumped. The lasing output of the SS laser is outcoupled either through the end of the SS laser or through the use of a grating formed on the top surface to extract light through diffractive interaction. The diode-array pump light is direct-coupled into the solid-state laser and is confined to the laser channel through total internal reflection by the air interface on the top surface, and with a dielectric coating (or other means, such as a low-index layer) on the bottom surface.

For doped waveguide devices, the doped SOG or polymer is spun onto the surface of the semiconductor wafer after the pumping diode laser end facet has been formed by etching (or other means) and after an appropriate coating has been applied to provide a suitable low-index layer for total internal reflection. The waveguides are then defined by etching or ion-implanting the SOG or polymer using established device fabrication techniques.

In more detail, the preferred embodiment of our invention consists of the following subcomponents:
Solid-state lasers:

1. One or more diode lasers or laser arrays that are formed along a shallow channel etched into the semiconductor substrate. The output facets of these diode lasers are arranged to emit their laser radiation into the channel from the sides. The channel will contain the solid state laser medium (e.g. doped glass or polymer) that is to be pumped. The sidewalls and ends of the channel are etched or otherwise formed to provide good surface figure at the appropriate wavelength. The laser arrays are constructed in situ on the semiconductor wafer using processes that are well-known to those skilled in the art. The epitaxial diode laser structure is designed so that the laser emission is at a wavelength corresponding to a pump band of the solid-state lasing medium.

2. A suitable dielectric coating may or may not be deposited to improve the optical confinement (total internal reflection) on one or more surface of the etched channel or the deposited solid state laser medium. One possible coating would be undoped SOG or polymer which has a lower refractive index than the doped material.

3. A solid-state lasing medium that is deposited in the channel between the pumping diode-laser arrays. The optical pump band of the solid-state lasing medium should absorb strongly at the emission wavelength of the diode laser array for efficient optical pumping. Different types of solid-state lasing mediums may be used. One preferred embodiment is a suitable ionic species, e.g., rare earth ions, in a spin-on glass. Typical lasing ionic species include but are not restricted to Nd, Ho, Er, Tm, and Cr ions. The spin-on glass might be of the kind typically employed in microelectronic processing. These include but are not restricted to silicate and siloxane-based materials. Methods for incorporating the lasing ion into the spin-on glass include but are not restricted to dissolving a suitable metal salt in the spin-on glass solution before spinning and solvent removal or introducing the metal after spinning by techniques such as ion implantation or thermal diffusion. Suitable thick layers for our monolithic laser can be formed with multiple spin and anneal steps. The doping concentration can also be varied in layers for improved optical confinement, e.g., at the bottom surface of the lasing medium or to achieve enhanced mode control or for other reasons which may become evident to those skilled in the art. These spin-on glasses generally exhibit good trench-filling behavior. They are presently commercially available with very low impurity concentrations (<5 ppm total metals). Acetate, halide, and nitrate salts of a number of common laser ions (Nd, Ho, Er) are commercially available with very high purities (99.99%) and are soluble in the spin-on glass solvent prior to the spin application. Another preferred embodiment is a suitable organic molecule, such as a laser dye, or rare-earth or transition metal lasing ion in a polymer matrix. This polymer may or may not be applied using spin-on technology, such as is routinely employed for photoresists and organic dielectrics in the semiconductor industry.

4. An output coupling mechanism for the SS laser. The SS laser beam is output coupled either through a polished or etched end facet, or through the top surface of the laser medium. Output coupling through the laser medium top surface is accomplished by forming a diffraction grating on this top surface. This diffraction grating is formed into the top surface of the SS laser to a depth sufficient for optical interaction with the lasing light in the SS laser cavity. Diffraction will couple the light from the entire surface out of the laser medium. By varying the depth of the grating, its spacing and the blaze profile, the output coupling fraction, beam output angle and tuning can be controlled.

In FIG. 1, the monolithic integrated solid-state laser 10 is fabricated on a semiconductor substrate (e.g. GaAs) on which a series of epitaxial semiconductor layers have been grown in the form of a p-n heterojunction. These epitaxial semiconductor layers are grown by conventional epitaxy methods such as metalorganic chemical vapor deposition (MOCVD) or molecular beam epitaxy (MBE) or other methods commonly known in the art. One preferred embodiment of the p-n heterostructure used for forming the semiconductor diode laser array 12 is a graded-index separate-confinement-heterostructure (GRIN-SCH) structure in GaAs/AlGaAs with a single-quantum-well lasing region. Other epitaxial layer structures (e.g. multiple-quantum-wells) and other semiconductor materials may be used depending on the emission wavelength required for optically pumping the solid-state lasing medium.

Using conventional semiconductor process technology, multiple-stripe diode laser arrays are fabricated on the epitaxial semiconductor wafer. These diode laser arrays may take the form of either index- or gain-guided arrays. The width and spacing of the lasing stripes in each array is well-known to those skilled in the art with stripe widths being in the range of 2–6 microns and stripe-to-stripe spacings of 4–10 microns, with the smaller widths and spacing preferred for index-guided arrays and the larger widths and spacings preferred for gain-guided arrays. Each array consists of typically 10–20 or more parallel lasing stripes; and a series of such arrays are formed in parallel, separated by a narrow etched trench or other means for preventing transverse lasing in the direction perpendicular to the stripes. The multiple laser arrays are preferably electrically contacted by a common metallization layer (e.g. Ti/Au) on the top (p-doped) surface of the semiconductor wafer and a common metallization layer (e.g. Ni/Ge/Au) on the bottom (n-doped) surface of the wafer.

The end-facet output mirror of the diode laser arrays is formed in the same dry etching (e.g. reactive ion beam or reactive ion etching) step used to form the 1–5 micron deep and 3–5 millimeter wide channel for subsequent deposition of the solid-state lasing medium. These output facets may be coated prior to the deposition of the solid-state lasing medium by either low reflectivity dielectric coating and/or protective coatings. The rear end-facet mirrors for the diode laser arrays are formed in a later step of device processing after the deposition of the solid-state lasing medium. These rear end-facet mirrors are preferably formed by cleaving the semiconductor crystal along a cleavage plane. Alternatively, the end-facet mirrors can be formed by etching. High-reflective dielectric mirrors may be deposited on the rear end-facet mirrors.

After fabrication of the diode laser arrays 12 (but prior to cleaving or etching the rear end-facet mirrors on the arrays), the solid-state lasing medium 14 is deposited into the etched channel in the semiconductor wafer. One preferred method for deposition and formation of the optically-pumped solid-state laser is to incorporate the lasing ions (e.g. rare earth ions such as $Nd^{3+}$ as shown in FIG. 1) into a spin-on glass matrix and to use spun-film technology such as is commonly used in the semiconductor industry for encapsulation and electrical insulation. Alternatively, the solid-state lasing medium may be in the form of organic dye molecules or lasing ions in a polymer host material, again applied by spun-film technology. In either case, the doping concentration is adjusted for efficient absorption of the optical pump radiation. Multiple spins of the solid-state lasing medium may be required to attain the desired 1–5 micron thickness of the solid-state laser. The dopant concentration may be varied between spin steps to control the refractive index profile (e.g. for efficient optical waveguiding in the horizontal and vertical dimensions) or for tailoring the absorption and lasing characteristics of the solid-state lasing medium.

Although the solid-state laser in FIG. 1 is shown with a uniform thickness in the lateral direction (in the direction of propagation of the diode array pump beams), we also envision other embodiments of the present invention in which the solid-state laser may be in the form of an array of emitters. Such an array could be fabricated either producing a shallow periodic modulation (in the direction normal to the direction of propagation of the diode array pump beams) on the bottom of the etched trench in the semiconductor substrate; or the periodic modulation could be applied to the solid-state host medium after deposition (either by etching shallow periodic grooves in the top surface or by using ion implantation to generate a series of lasing stripes in the same manner used for the diode laser array). The shallow extent of the modulation required for the formation of an array is not expected to interfere with the optical pumping by the diode laser array. The formation of a solid-state laser array may have advantages for lateral mode control.

Additional components, such as the optional Q-switch 15 in FIG. 1, may be added either as a part of the spun-on process sequence or by other means.

These added components can enhance the performance and mode of operation of the solid-state laser to provide, for example, high-energy short-pulse lasing, high-speed modulation, or nonlinear optical frequency generation. Electrical contacts may be applied to these components (either before or after the deposition process) as required for the attainment of electro-optical effects (e.g. phase, amplitude, and frequency modulation and control).

After deposition and subsequent curing of the solid-state lasing medium, the semiconductor wafer may be thinned from the nominal 0.5 millimeter thickness to about 100 micrometers to aid in heat removal for high-duty-cycle operation. The end-facet mirrors 16 and 18 are then formed on the solid-state laser by cleaving the semiconductor wafer. Alternatively, the end-facet mirrors may be formed by etching or polishing techniques. Reflective coating are then applied to the end-facet mirrors to increase the cavity Q and to provide lasing output in the preferred direction.

Packaging of the completed laser may be accomplished by any of the means commonly employed for semiconductor diode lasers and integrated optics components. The resultant package can be hermetically sealed with optical windows or optical fibers for coupling out the lasing light. The resulting package is very compact and rugged, and has a low manufacturing cost.

Figure 2:
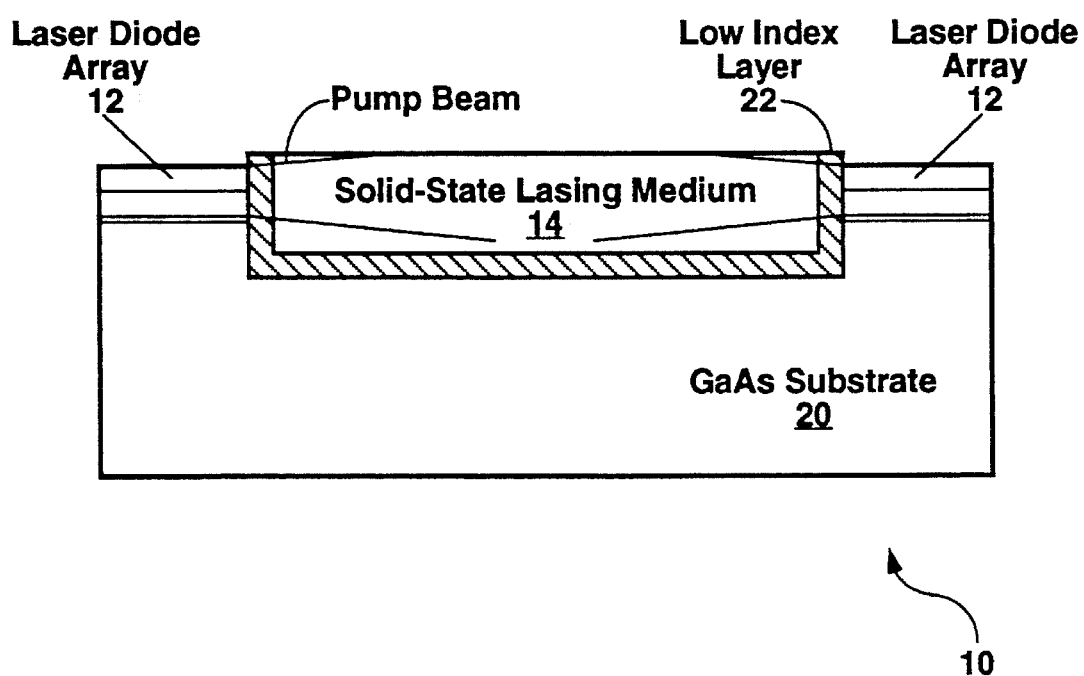
FIG. 2 is a side view of the device of FIG. 1.

FIG. 2 shows a side view of this embodiment with the GaAs substrate 20, and the optional low index of refraction layers 22 at the bottom and sides of the waveguide 14.

Figure 3:
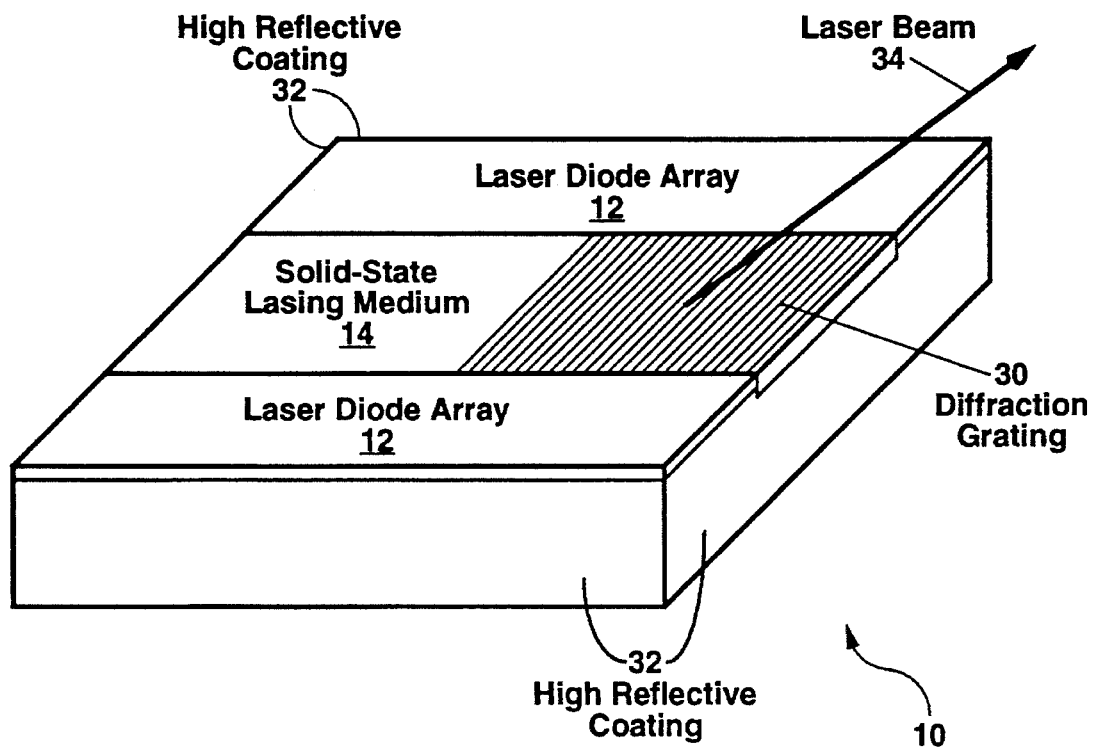
FIG. 3 is an isometric view of an alternate embodiment of the device of FIG. 1 in which the output mirror has been replaced by a diffraction grating.

FIG. 3 shows an alternate output coupling scheme for the monolithic integrated solid-state laser. In this embodiment of our invention, a blazed diffraction grating 30 (e.g. a second order diffraction grating) is formed on the top surface of the solid-state lasing medium 14 by photolithography followed by etching (wet or dry) or other means (e.g. ion milling). The grating penetrates the active region to a depth sufficient to interact with the optical field within the laser cavity, thereby coupling a fraction of the lasing power out the top surface of the laser 34. The surface coverage of the grating and its penetration depth are predetermined to provide the desired outcoupled fraction of the lasing power; the difference between the grating period and the lasing wavelength will determine the emission angle from the normal to the top surface of the solid-state laser. Reflective layers may be coated on the semiconductor substrate in the etched trench prior to deposition of the solid-state lasing medium. This will serve to redirect the light diffracted by the grating in the direction of the semiconductor substrate and thereby further increase the fraction of the lasing light coupled out the tope surface of the solid-state laser.

The use of a diffraction grating outcoupler allows high reflective coatings 32 to be applied to both ends of the solid-state laser cavity. In addition, the large surface area of the grating outcoupler will result in a much larger output beam which will have a much smaller beam divergence. This is advantageous for many applications since the need for a collimation lens at the output of the solid-state laser will be eliminated. In addition, steering of the output beam emission angle is possible by incorporating into the solid-state laser cavity a means for controlling and varying the lasing wavelength.

Figure 4:
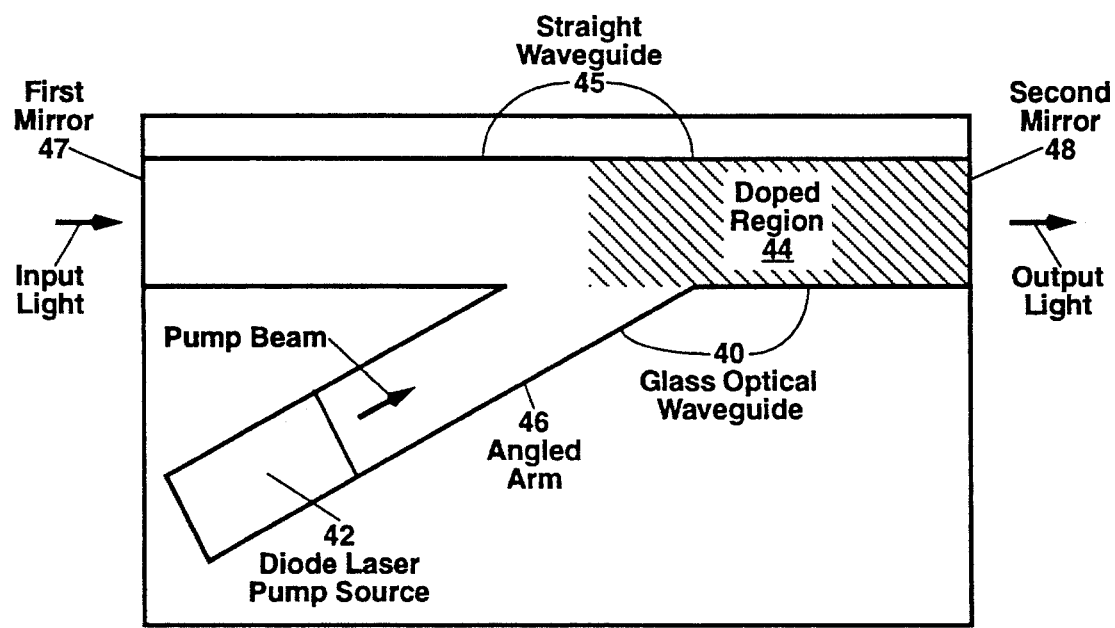
FIG. 4 is a top view of another embodiment of the invention in which the optical cavity is pumped by a single laser diode located in a side area of the device.

FIG. 4 shows an embodiment of the present invention with longitudinal optical pumping via a Y-junction waveguide 40. This embodiment has advantages when the solid-state laser is used for integrated optics applications. In this case, a laser 42 is required with a small stripe width. For fundamental mode operation, the stripe width is typically in the range of 2–6 microns, depending on the refractive index of the lasing medium and the lateral refractive index difference between the waveguide and the surrounding medium. In FIG. 4, the semiconductor diode laser 42 is in the form of a narrow-stripe laser with a width matched to the solid-state waveguide 40 for efficient input coupling to the waveguide. The fabrication methods for the semiconductor diode laser are as discussed previously and are well known to those skilled in the art.

One preferred method for coupling the diode laser pump source into the solid-state waveguide laser is to use a Y-junction waveguide as shown in FIG. 4. In this way, the pump light is efficiently coupled into the angled arm 46 of the solid-state waveguide laser 40. Furthermore, the pump light is confined to the waveguide thereby allowing the pump light to be more fully utilized in pumping the solid-state lasing medium. In addition, this longitudinal pumping scheme allows the doping of the host solid-state laser medium to the waveguide width (e.g. an absorption depth of 3–5 millimeters for example as compared to a waveguide width of 5 microns). Additional Y-junctions and diode laser pump sources can be added to the solid-state waveguide laser at regularly spaced intervals to increase the gain and output power from the solid-state waveguide laser. In addition, other pumping schemes (e.g. end-fire pumping) are possible depending on the particular application.

The doping concentration of lasing ions or molecules in the solid-state waveguide laser can be localized to the region 44 of the straight waveguide 45 beyond the Y-junction for more efficient use of the optical pump energy. This selective doping can be incorporated in the spun-film deposition process or by thermal diffusion or ion implantation or other methods. The cavity mirrors 47 and 48 for the solid-state waveguide laser may be formed by cleaving, etching, polishing, or by the formation of a diffraction grating, not shown, on the top surface of the waveguide. In the latter case, the diffraction grating may be of the first order for high reflection in the waveguide direction or as a second order grating for partial outcoupling at the top surface of the waveguide. Other laser cavity configurations may be envisioned (e.g. circular or square ring resonators) which may have advantages for particular applications. In the case of unidirectional ring lasers, the optical pump light from the diode laser can be injected into the ring in one direction while, the solid-state lasing beam propagates around the ring in the opposite direction. This may have advantages for optically isolating the light from the diode and solid-state lasers with the diode laser light confined to the ring cavity while the solid-state lasing is coupled out of the ring.

Alternately, these solid-state waveguides may be used as optical amplifiers in which case anti-reflection coatings may be applied to one or both ends of the waveguide; or in the event that these solid-state waveguides are incorporated into an integrated optic circuit, no coatings are necessary. In this latter case, a part or the whole of the integrated circuit may be composed of these solid-state waveguides with the entire circuit doped with lasing ions or molecules and optically pumped to act as an active waveguide device or with selected portions of the circuit doped with lasing ions or molecules and optically pumped to provide periodic gain in the circuit to compensate for absorption and scattering losses in the unpumped regions.

In the formation of an integrated optic circuit, the solid-state waveguides may be selectively doped in some locations with rare-earth ions or organic dye molecules in some regions to provide lasing action or optical gain, while other regions may be doped with other materials for other purposes (e.g. satuarable absorbers for mode locking; electro-optic materials for Q-switching and amplitude, phase, and frequency modulation and control; nonlinear optical materials for frequency harmonic generation and frequency mixing; and other effects as known to those skilled in the art). The use of different host materials at different locations on the integrated optic circuit is possible by using selective making, deposition, etching, and other processing methods as known to those skilled in the art. Thus for example, a solid-state waveguide laser may be formed in one region of the circuit using spin-on glass as the host medium, followed by a second harmonic generator in the form of a spun-on organic polymer waveguide. Many other combinations of host media and dopant materials for the design of integrated optic components and circuits will become evident as skill in the art progresses.

The monolithically integrated diode-laser-pumped SOG laser embodiment of the invention should exhibit good operating efficiency. Preliminary system calculations have shown that 10 mJ total input energy from the diode-laser arrays will produce 5.4 mJ output energy for a 10×mm×5 mm×1 micrometer thick monolithic Nd:glass conversion efficiency. For a laser running at a 2% duty cycle, 27 W of pulsed and over 0.5 W of average lasing power could be produced. With Q-switching, the peak power could be increased to greater than 500 kW (10 ns pulse).

We claim:

1. A monolithically integrated solid state optical circuit formed on a semiconductor substrate comprising:

at least one excitation pump source of light formed on the semiconductor substrate;

an optical waveguide means on the substrate comprising spun-on glass formed adjacent to and optically coupled to the at least one source of excitation pump light wherein the waveguide means includes a portion containing a dopant material which exhibits optical gain in response to the absorption of radiation from the at least one excitation pump source of light; and output means optically connected to the waveguide means.

2. The circuit of claim 1 wherein the spin-on glass contains materials having a saturable optical loss.

3. The circuit of claim 1 wherein the spin-on glass contains materials that enable lasing action when pumped by the excitation pump source of light, wherein such light is laser light, at a wavelength corresponding to an absorption energy of the material.

4. The circuit of claim 1 wherein the spin-on glass contains materials that enable frequency conversion.

5. The circuit of claim 1 wherein the optical waveguide is optically coupled to the at least one excitation pump source of light on at least one side of the optical waveguide.

6. The circuit of claim 1 wherein the optical waveguide further comprises an additional limb disposed at an acute angle to and intersecting with the optical waveguide such that the excitation pump source of light is located at the end of the additional limb.

* * * * *